US011411816B1

(12) United States Patent
Saluja et al.

(10) Patent No.: US 11,411,816 B1
(45) Date of Patent: Aug. 9, 2022

(54) IMPLEMENTING MANAGEMENT MODES FOR USER DEVICE MANAGEMENT

(71) Applicant: VMware, Inc., Palo Alto, CA (US)

(72) Inventors: Neeraj Saluja, Austin, TX (US); Haroon Barlas, Austin, TX (US); Eugene Sayapin, Austin, TX (US); Shravan Shantharam, Cumming, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/326,934

(22) Filed: May 21, 2021

(51) Int. Cl.
| | |
|---|---|
| *G06F 15/177* | (2006.01) |
| *H04L 41/082* | (2022.01) |
| *H04L 41/0806* | (2022.01) |
| *H04L 101/622* | (2022.01) |
| *H04L 67/303* | (2022.01) |
| *H04L 67/01* | (2022.01) |
| *H04L 41/0823* | (2022.01) |

(52) U.S. Cl.
CPC ........ *H04L 41/082* (2013.01); *H04L 41/0806* (2013.01); *H04L 41/0823* (2013.01); *H04L 61/6022* (2013.01); *H04L 67/303* (2013.01); *H04L 67/42* (2013.01)

(58) Field of Classification Search
CPC . H04L 41/082; H04L 67/303; H04L 41/0823; H04L 61/6022; H04L 41/0806; H04L 67/42
See application file for complete search history.

(56) References Cited

U.S. PATENT DOCUMENTS

| | | | |
|---|---|---|---|
| 2018/0167491 A1* | 6/2018 | Roszak | ................... G06F 21/10 |
| 2018/0276000 A1* | 9/2018 | Roszak | ................... G06F 9/452 |
| 2019/0149405 A1* | 5/2019 | Verma | ................... H04L 67/125 |
| | | | 709/222 |

* cited by examiner

*Primary Examiner* — Padma Mundur (74) *Attorney, Agent, or Firm* — Clayton, McKay & Bailey, PC (57) ABSTRACT

Systems and methods are described for managing a user device in multiple management modes. In an example, an agent executing on the user device can enroll the user device with a Unified Endpoint Management ("UEM") system in a limited management mode. The agent can receive and install a first configuration profile from a server that configures the agent to operate on an unmanaged channel of the user device. In one example, the user device can have a third-party management client that manages the user device on a managed channel. The third-party management client can be removed. The agent can enroll the user device with the UEM in a full management mode. The agent can receive and install a second configuration profile that configures the agent to operate on the managed channel of the user device.

17 Claims, 4 Drawing Sheets

IMPLEMENTING MANAGEMENT MODES FOR USER DEVICE MANAGEMENT

BACKGROUND

Enterprise organizations commonly use device management systems for managing employee's user devices associated with the enterprise. These systems allow an enterprise to enforce security and compliance policies on user devices that connect to the enterprise's internal network and access its resources. Ensuring device security and compliance can be crucial in preventing unauthorized access to the network or sensitive data. There are numerous device management products that enterprises can use, and each product often provides a unique combination of features and tools.

One problem with current device management systems is that they require permissions to manage the user device, but some device management systems prohibit other products performing device management operations on a user device. This prevents users from being able to utilize features or tools from two different device management systems simultaneously where one of the systems blocks the other.

In some cases, an enterprise organization may want to try out a new device management system, but restrictions from its existing device management system may prohibit it from doing so without first removing the existing system. This can create security risks during transition and incur massive costs if they want to roll back to the old system.

As a result, a need exists for implementing a device management system in a limited management or an unmanaged mode, allowing it to coexist with other restrictive device management systems.

SUMMARY

Examples described herein include systems and methods for managing a user device. In an example, an agent executing on the user device can enroll the user device with a server in a limited management mode. In one example, the agent and server can be part of a Unified Endpoint Management ("UEM") system. The limited management mode can allow the agent to perform certain functions but restrict the agent from performing any device management operations. In one example, device management operations can include any operations performed on a managed channel on the user device, such as managing a managed application or service, managing device updates, and attesting to the device health. In one example, the user device can have a third-party application or client installed that provides such device management services. Such a third-party client can sometimes prohibit other unaffiliated agents from accessing the managed channel. The limited management mode can allow a user to experience certain features and functionalities provided by the UEM system and the agent in such an example.

In an example, the agent can send certain information that uniquely identifies the user device to the server. As an example, the agent can send a universal device identifier ("UDID"). The UDID can be retrieved from a registry on the device or created by the agent, depending on the example. In another example, the agent can send a hardware device identifier ("HWDevID"). The HWDevID can be one of or a combination of identifiers ("IDs") associated with a physical component of the user device, such as a hard disk ID, a Basic Input/Output System ("BIOS") ID, a media access controller ("MAC") address, a serial number, and a model number. In one example, the agent can hash the HWDevID and send the hash to the server. The various IDs can be used to collect and organize data related to the user device.

Collecting the HWDevID can be advantageous because, unlike the UDID, it does not change even if the user device gets wiped. For example, a third-party management client can be configured to wipe some or all data on the user device as part of a security protocol, such as when its management controls are removed. This can cause the UDID to be erased. In such an example, the agent could not use the UDID to identify the user device for reenrolling or upgrading to full management mode. The HWDevID, however, remains constant and accessible, even after a full device wipe. In an example, the agent can be configured to retrieve IDs from a specific hardware component or combination of hardware components and hash the IDs in a specific order to create the HWDevID. Even if the user device is wiped, the HWDevID can be used to identify the user device and reenroll or upgrade the device to full management mode. Because removing a third-party management client from the user device may be required to upgrade the agent to full management mode, the HWDevID can preserve the status of the user device during the upgrade process.

In an example, the server can send a first configuration profile to the user device in response to the enrollment request. The first configuration profile can be a data file with configuration settings and instructions for limited management mode. In one example, the first configuration profile can configure the agent to operate on a channel other than the management channel for executing instructions received from the UEM system. In another example, in limited management mode the agent can perform operations like installing a virtual private network ("VPN") tunnel client for securely communicating with the server and other devices associated with the UEM system, allowing remote access and control of the user device from the UEM system, and collecting data from the user device.

In an example, the agent can be reconfigured to operate in full management mode. For example, the agent can send a full management mode enrollment request to the server. The server can generate a second configuration profile that includes configuration settings and instructions for the full management mode. In one example, the second configuration profile can configure the agent to operate on the user device's managed channel. This can allow the agent to perform functions on the managed channel like application delivery and management, device update management, and health attestation. In one example, the agent can enroll the user device in full management mode after the third-party management client or its device management access is removed.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for managing a user device in multiple management modes. In an example, an agent executing on the user device can enroll the user device with a UEM system in a limited management mode. The agent can receive and install a first configuration profile from the server that configures the agent to operate on an unmanaged channel of the user device. In one example, the user device can have a third-party management client that manages the user device on a managed channel. The third-party management client can be removed. The agent can enroll the user device with the UEM in a full management mode. The agent can receive and install a second configuration profile that configures the agent to operate on the managed channel of the user device.

Figure 1:
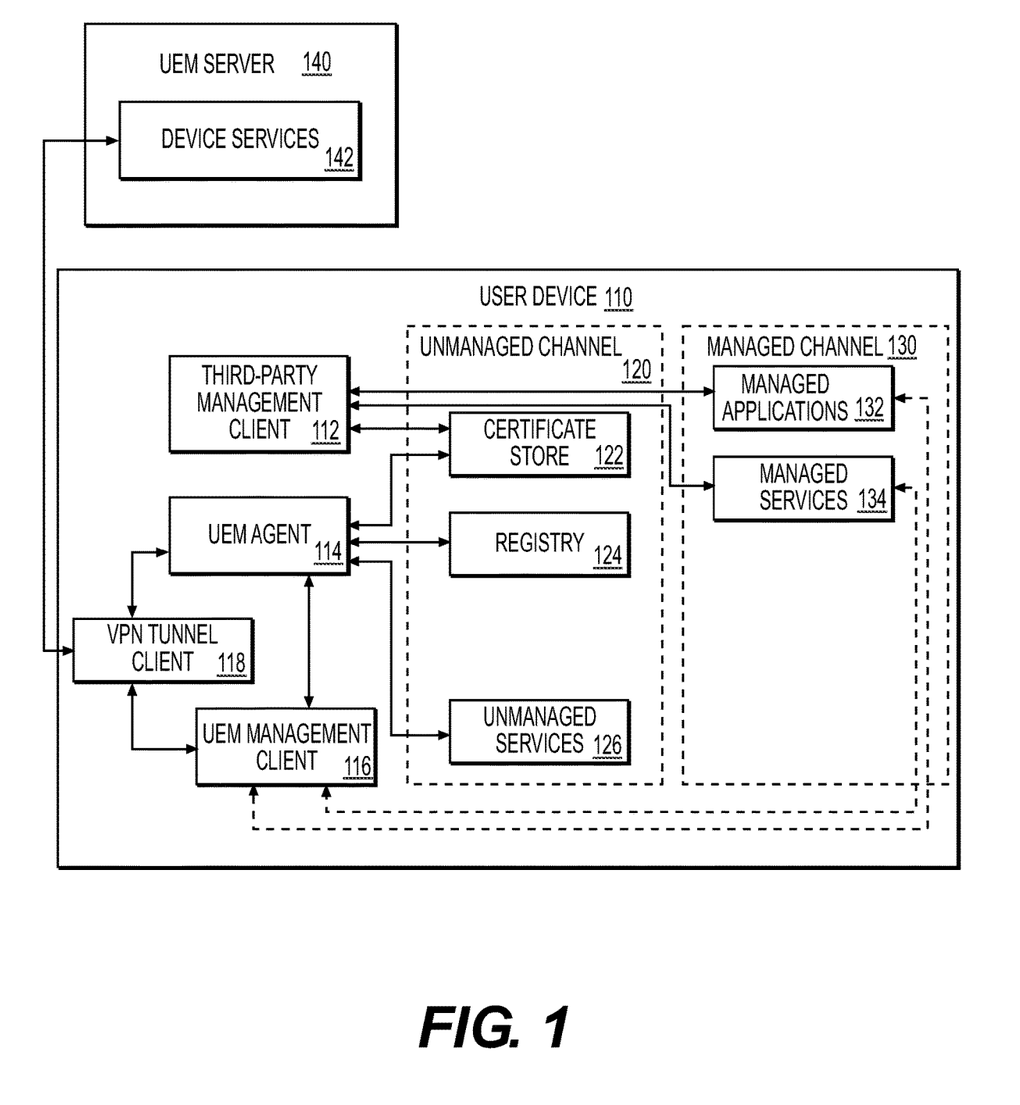
FIG. 1 is an illustration of a system for performing limited device management.

FIG. 1 is an illustration of a system for performing limited device management. In an example, a user device 110 can include a third-party management client ("third-party client") 112. The user device 110 can be one or more processor-based devices, such as a personal computer, tablet, or cell phone. The third-party client 112 can be a management client that communicates management instructions to the user device 110 from a third-party server using a managed channel 130 on the user device 110. The third-party client 112 be a stand-alone application, part of an enterprise application, or part of an operating system, depending on the example.

A channel can be an interprocess communication mechanism that allows processes in an operating system to managed shared data using certain protocols. The channel can use message passing to invoke behavior in an operating system. For example, a process or thread can send a message over a channel, and another process or thread that has a reference to the channel can receive the message. A reference can be a value that enables a process or thread to identify and access a particular datum or data stream. An example of a device management communication protocol is the OPEN MOBILE ALLIANCE DEVICE MANAGEMENT ("OMA-DM") protocol.

In an example, the management channel 130 can be a channel used for management functions on the user device 110. For example, the management channel 130 can allow a system administrator to send device management commands to the user device 110. As an example, a server associated with the third-party client 112 can send device managed commands to the user device 110 through the third-party client 112. The third-party client can execute the device managed commands on the managed channel 130. Examples of such commands can include configuring compliance and security settings, wiping data from the user device 110 when compliance or security settings are not met, and installing and managing managed applications 132. In one example, access to the managed channel 130 can be restricted to services, applications, and clients with elevated access rights, such as management rights or administrator ("admin") rights. In another example, managed applications 132 and services 134 can only be accessed or managed on the managed channel 130. For example, clients or services with device management access can be given a reference value that enables them to identify communications the management channel 130. Clients and services without the reference value are unable to effect any changes or execute any commands on the managed channel 130. In one example, the third-party client 112 can be configured to block other clients and services from accessing the managed channel 130. For example, the third-party client 112 can have control of the managed channel 130 and prevent any other clients and services from obtaining the reference value of the managed channel 130. In one example, the third-party client 112, or any other client that may control the managed channel 130, can set the reference value for the managed channel 130.

In an example, the user device 110 can include a UEM agent 114 and a UEM management client 116. The UEM agent 114 and UEM management client 116 can communicate with a UEM server 140 to enforce management of the user device 110. In an example, the UEM agent 114 and UEM management client 116 can be stand-alone applications, part of an enterprise application, or part of an operating system, depending on the example. The UEM server 140 can be a single server or a group of servers, including multiple servers implemented virtually across multiple computing platforms.

In an example, the UEM server 140 can provide multiple types of management modes to the user device 110 through the UEM agent 114. For example, the UEM server 140 can handle enrollment of user devices 110, and the user devices 110 can request to enroll in a full management mode or a limited management mode. Full management mode can provide the UEM agent 114 with full functionality. For example, in full management mode the UEM agent 114 can perform functions like application delivery and management, device update management, and health attestation. The UEM agent 114 can also have access to the managed channel 130 when in full management mode. In addition to these functions, in full management mode the UEM agent 114 can also perform functions available in limited management mode described below.

In an example, when a user device 110 enrolls with the UEM server 140 in the limited management mode, the UEM agent 114 can be configured to perform a subset of full management mode capabilities. Some capabilities in the subject can include installing a VPN tunnel client 118 on the user device 110. The UEM agent 114 can securely communicate with a device services 142 using the VPN tunnel client 118. In an example, the device service 142 can be a service on the UEM server 140 that provides enterprise resources and enrollment data to user devices 110. In another example, in limited management mode the UEM agent 114 can allow a remote user to remotely manage the user device 110 using an admin console associated with the UEM server 140. In one example, the remote management capabilities can be limited by an operating system ("OS") on the user device 110 or the third-party client 112. In another example, the UEM agent 114 can include data gathering capability. The UEM agent 114 can collect telemetry and event data from the user device 110 and send it to the device services 142 for analysis. For example, the UEM agent 114 can collect data on updates, certificates, properties, capabilities, security, firewall, BIOS settings, and more.

In an example, in limited management mode the UEM agent 114 may not be able to install or manage applications on the managed channel 130, install system updates, or attest to the health of the user device 110. In one example, the user device 110 can include an unmanaged channel 120. The unmanaged channel 120 can be a channel that does not restrict access to services, applications, and clients with management rights. For example, the user device 110 can allow access to both the third-party client 112 and the UEM agent 114 on the unmanaged channel 120. In one example, in limited management mode the UEM agent 114 can access unmanaged services 126 in the unmanaged channel 120, but not the managed services 134 in the managed channel 130.

In some examples, the third-party client 112 may prohibit other clients or agents from accessing the managed channel 130. In such an example, the limited management mode of the UEM agent 114 can allow a user to still use non-management features provided by the UEM server 140. Limited management mode can also allow a user to test aspects of UEM services and features before enrolling in full management mode. For example, regardless of whether the user device 110 includes the third-party client 112, a user can have the UEM agent 112 configured in limited management mode so that the user can try out UEM features before granting the UEM agent 112 access to the managed channel 130 in full management mode.

In an example, the UEM agent 114 can communicate with device services 142 on the UEM server 140 for enrollment and configuration. For example, a user can install the UEM agent 114 on the user device 110. The user can request that the UEM agent 114 enroll the user device 110 with the UEM server 140. The user can make the request through a user interface ("UI") of the UEM agent 114 or as part of a staging process. The request can include credentials that the UEM server 140 can use to authenticate the user device 110. In one example, the request can include information that uniquely identifies the user device 110, such as a UDID or a HWDevID. In one example, the HWDevID can be one of, or a combination of, IDs associated with a physical component of the user device, such as a hard disk ID, a BIOS ID, a MAC address, a serial number, and a model number. In an example where the third-party client 112 controls the managed channel 130, the third-party management client 112 may have written a UDID to a registry 124 on the user device 110. The UEM agent 114 can check the registry 124 to determine whether the UDID has already been written there. If so, the UEM agent 114 can retrieve the UDID and send it to the device services 142. If not, the UEM agent 114 can generate a new UDID, write it to the registry 124, and send it to the device services 142. The device services 142 can authenticate the user device 110 and respond with a configuration profile that corresponds to the type of management mode requested.

In an example, communications between the UEM agent 114 and the UEM server 140 can be sent over a network, such as the Internet or a local area network. In another example, a configuration profile can be sent as a data file that includes configuration commands for configuring the UEM agent 114. The configuration profile can be an Extensible Markup Language ("XML") file, Hypertext Markup Language ("HTML") file, or a JavaScript Object Notation ("JSON") file, for example. The device services 142 can send the configuration profile using an Application Programming Interface ("API") call, in one example.

The UEM agent 114 can install the configuration profile received from the device services 142. In one example, the configuration profile can include a security certificate. The security certificate can be used by the UEM agent 114 to authenticate itself with the device services 142. The UEM agent 114 can store the certificate in a certificate store 122 on the user device 110. The certificate store 122 can be a component on the unmanaged channel 120 that securely stores security certificates.

In an example, the UEM agent 114 can be responsible for handling non-management capabilities, and the UEM management client 116 can be responsible for handling management capabilities. In one example, the configuration profile for limited management mode can include instructions for configuring the UEM agent 114 to perform the non-management functions. In another example, the configuration profile for the full management mode can include instructions for configuring the UEM management client 116. For example, the UEM agent 114 can configure the UEM management client 116 to utilize the managed channel 130, such as installing managed applications 132 and accessing managed services 134. The dashed lines between the UEM management client 116 and the managed applications 132 and services 134 in FIG. 1 represent the access the UEM management client 116 can have after the third-party client 112 is decoupled from the managed channel 130. In one example, the UEM agent 114 can verify that the third-party client 112 does not control the managed channel 130 before configuring the UEM management client 116. In another example, the configuration profile for full management mode can include a software installation package for the UEM management client 116, which the UEM agent 114 can use to install the UEM management client 116. In still another example, the UEM management client 116 can take over certain functions from the UEM agent 114 in full management mode. For example, the UEM management client 116 can handle managing the certificate store and authenticating the user device 110.

Figure 2:
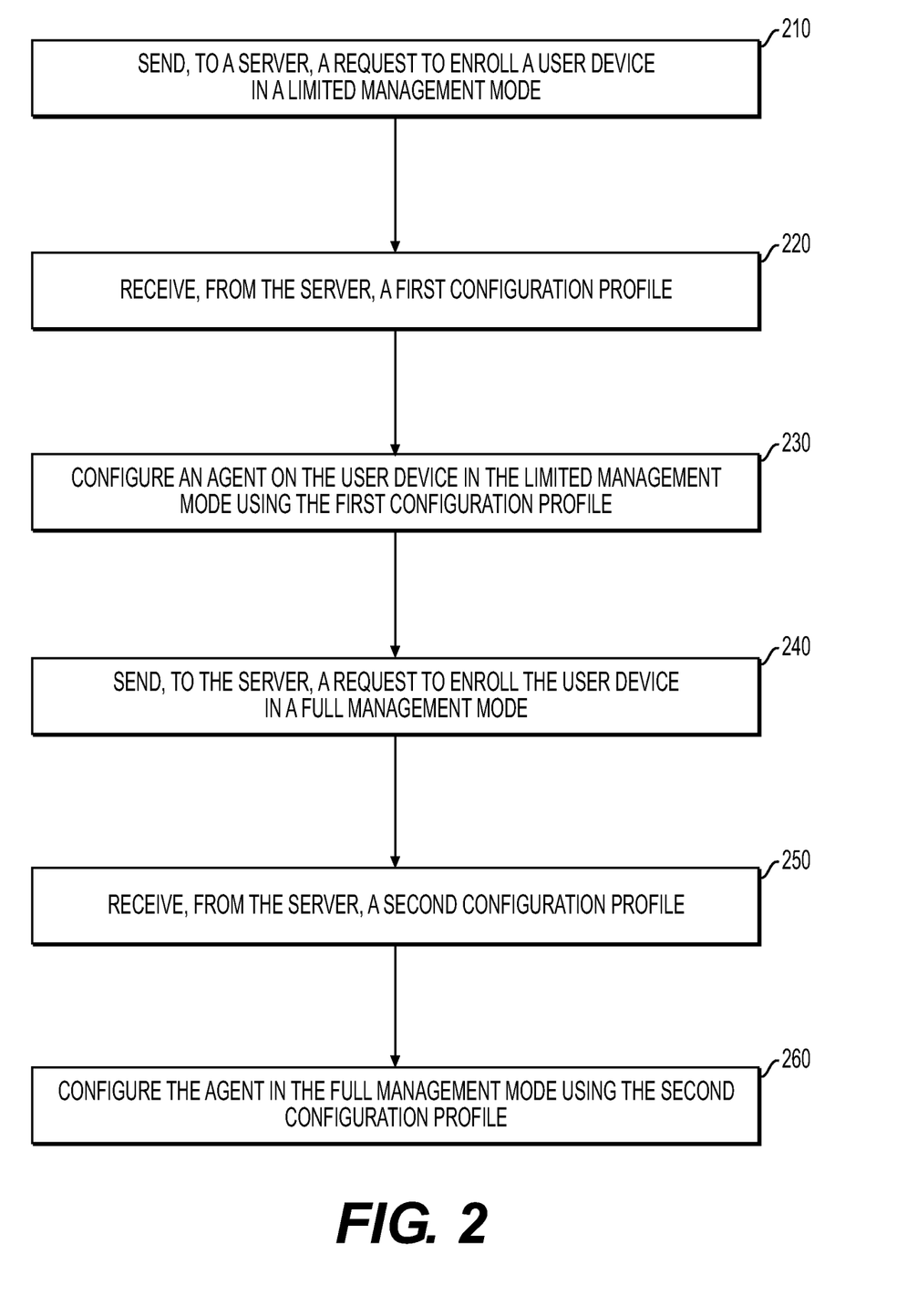
FIG. 2 is a flowchart of an example method for performing limited device management.

FIG. 2 is a flowchart of an example method for performing limited device management. At stage 210, the user device 110 can send, to the UEM server 140, a request to enroll the user device 110 in a limited management mode. Limited management mode can be a mode where the UEM agent 114 can perform a subset of full management capabilities. For example, in limited management mode the UEM agent 114 can install the VPN tunnel client 118 for securely retrieving enterprise resources through the UEM server 140, collect telemetry and event data on the user device 110, allow remote access or control of the user device 110, and access unmanaged services 126, among other things.

In an example, the enrollment request can include credentials that the UEM server 140 can use to authenticate the user device 110. In one example, a user can enter credentials into a UI associated with the UEM agent 114. In another example, the credentials can be provided by an admin device as part of a staging process. For example, the admin device can connect to the user device 110 via BLUETOOTH, WIFI, Near-Field Communication ("NFC") or other methods. The admin device can retrieve information necessary to enroll the user device 110 and provide the information to the device services 142. In one example, the enrollment information can include one or more identifiers associated with the user device 110, such as a UDID or HWDevID. The UEM agent 114 can retrieve a UDID from the registry 124 that the third-party client 112 already created. In another example where the UDID is not present, the UEM agent 114 can create a new UDID. In an example where the UEM agent 114 communicates directly with the UEM server 140 to enroll the user device 110, the UEM agent 114 can send the UDID and HWDevID with the enrollment request.

At stage 220, the user device 110 can receive, from the UEM server 140, a first configuration profile. The first configuration profile can be a data file that includes data for configuring the UEM agent 114 in limited management mode. In an example, the first configuration profile can include a software package for certain features associated with the limited management mode. For example, the first configuration profile can include software installation files for the VPN tunnel client 118 and the UEM management client 116 if it is not already installed.

At stage 230, the user device 110 can configure the UEM agent 114 in the limited management mode using the first configuration profile. In one example, the first configuration profile can include a certificate. The UEM agent 114 can write the certificate to the certificate store 122. The UEM agent 114 can retrieve the certificate from the certificate store 122 to authenticate itself when communicating with device services 142. In one example, the first configuration profile can include settings for event data gathering. For example, the first configuration profile can instruct the UEM agent 114 on which data to gather and send back to the device services 142.

In an example, installing the first configuration profile can include installing any software installation files received. For example, the UEM agent 114 can install the VPN tunnel client 118. In one example, the UEM agent 114 can create a new channel with the VPN tunnel client 118 so that other services cannot access it. The UEM agent 114 can begin communicating with the device services 142 using the VPN tunnel client 118, which can allow the device services 142 to securely provide enterprise resources to the user device 110.

In an example, the UEM agent 114 can configure data gathering settings using the first configuration profile. For example, the UEM agent 114 can collect data on successful and failed logons; boot sequences; shutdowns; screensaver events; application crashes, starts, exits, hangs, installs, and uninstalls; device lock, unlock, logoff, sleep, and wake events; unexpected shutdowns; system crashes; software patch installs and uninstalls; and service starts, stops, and installs. The UEM agent 114 can report some or all the collected data to the device services 142.

In an example, the UEM agent 114 can install remote assist capabilities. For example, installing the first configuration profile can configure the UEM agent 114 so that it can grant access or control to a trusted remote device, such as an admin device. In one example, the remote access or control capabilities of the remote device can be limited by settings on the OS of the user device 110 or the third-party client 112. For example, the remote device can also be restricted from operating on the managed channel 130.

At stage 240, the user device 110 can send, to the UEM server 140, a request to enroll the user device 110 in a full management mode. In an example, full management mode can provide the capabilities of limited management mode as well as device management capabilities. For example, in full management mode the UEM agent 114 can perform functions like application delivery and management, device update management, and health attestation. The UEM agent 114 can also have access to the managed channel 130 when in full management mode.

In one example, the full management mode request can be initiated by a user. For example, a user can use a UI associated with the UEM agent 114 to create the request. In another example, an admin device can send the request to the UEM server 140. For example, an admin user can use an admin device, like an admin console, to select the user device 110 for enrolling in full management mode. In one example, the admin device can select a group of devices that the user device 110 belongs to.

In an example, the request can include the certificate received at stage 220. For example, the UEM agent 114 can retrieve the certificate from the certificate store 122 and send it to the device services 142. The device services 142 can use the certificate to authenticate the user device 110 for enrolling in full management mode. In another example, the UEM agent 114 can also send the UDID and the HWDevID, which the UEM server 140 can use to identify the user device 110.

An example can occur where the user device 110 gets wiped while in limited management mode. For example, the third-party client 112 can prohibit other management clients or services from accessing the managed channel on the user device 110 while it has management control. The third-party client can be configured to wipe the user device 110 when its management access is removed. This can cause the UEM agent 114 and the UDID to be erased from the user device 110. In such an example, the device services 142 can still use the HWDevID to identify the user device 110 because the HWDevID would not change after a device wipe. A user can install the UEM agent 114 on the user device 110 and submit a full management mode enrollment request. The UEM agent 114 can send the request, along with the HWDevID, to the UEM server 140. The user device's 110 HWDevID can be mapped to the data previously collected by the UEM agent 114. The UEM server 140 can use the HWDevID to identify the data and create a full management mode configuration profile for the user device 110.

At stage 250, the user device 110 can receive, from the UEM server 140, a second configuration profile corresponding to the full management mode. The second configuration profile can be a data file, such as an XML, JSON, or HTTP file, that includes configuration settings and any software packages related to features of full management mode. For example, the second configuration profile can include software installation files or configuration files for the UEM management client 116 if it is not already installed.

At stage 260, the user device 110 can configure the agent in the full management mode using the second configuration profile. For example, the UEM agent 114 can install the configuration profile, including installing any software installation files and adding registry files to the registry 124. In one example, the UEM agent 114 can handle non-management functions, and the UEM management client 116 can handle management functions. In this example, installing the configuration profile can include configuring the UEM management client 116 to operate on the managed channel 130 so that it can manage the managed applications 132 and managed services 134.

Figure 3:
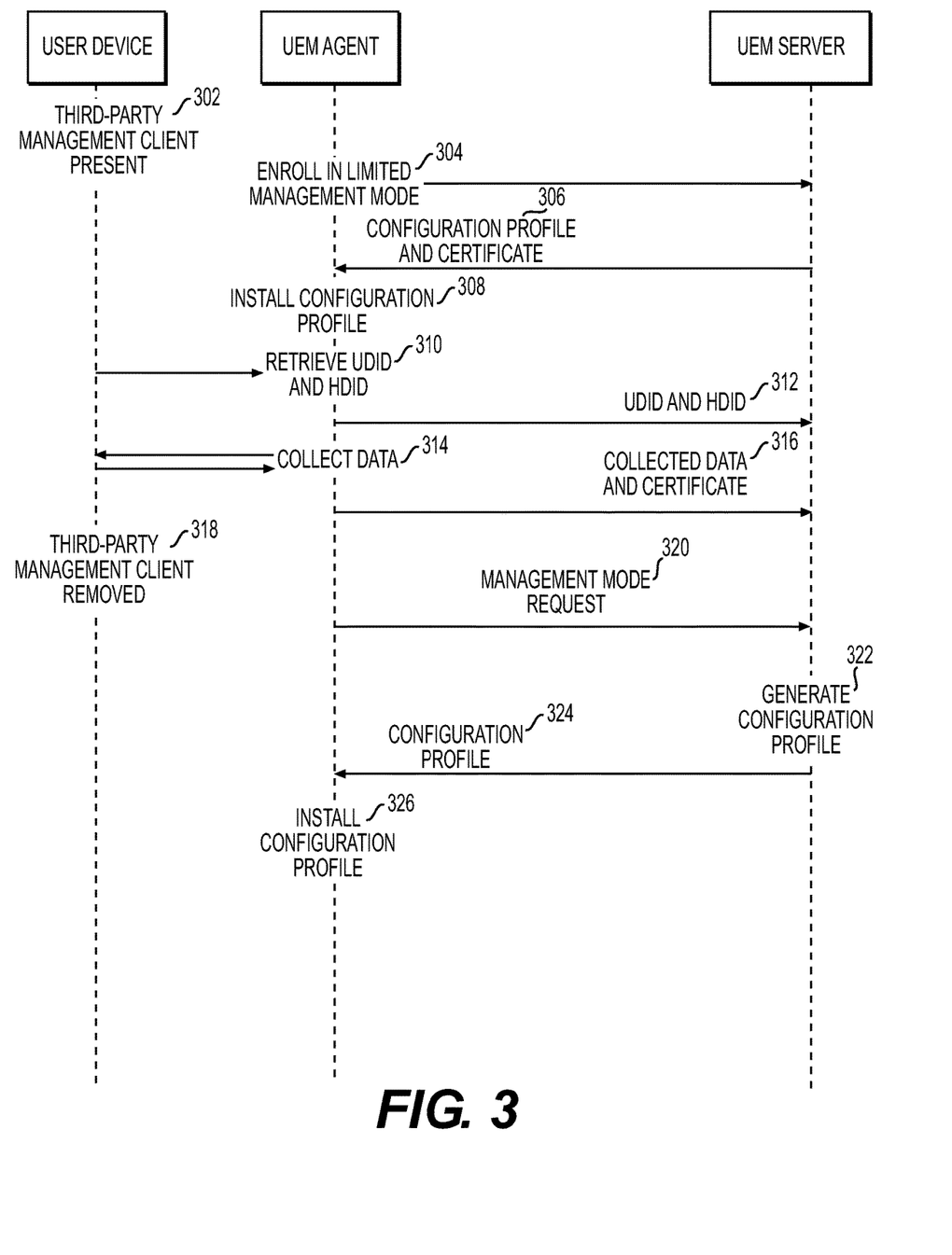
FIG. 3 is a sequence diagram of an example method for performing limited device management.

FIG. 3 is a sequence diagram of an example method for performing limited device management where the UEM agent 114 can operate in limited and full management modes. At stage 302, the user device 110 can have the third-party client 112 installed thereon. In an example, the third-party client 112 can be a management client that manages the user device 110 and restricts access to the managed channel 130. The third-party client 112 can therefore prevent other device management clients from obtaining device management access.

At stage 304, the UEM agent 114 can enroll the user device 110 with the UEM server 140 in limited management mode. For example, the UEM agent 114 can send an enrollment request to the UEM server 140. In an example, the enrollment request can include credentials for a user profile that the UEM server 140 can use to authenticate the user device 110. In one example, the request can indicate the desired enrollment type. In another example, a user ID in the credentials can be mapped to a table accessible by the UEM server 140 that indicates that the user device 110 should be enrolled in limited management mode.

At stage 306, the UEM server 140 can send a configuration profile for limited management mode and a certificate to the UEM agent 114. In an example, the configuration profile can be a data file, such as an XML, JSON, or HTML file. In another example, the certificate can be a security certificate that the UEM agent 114 can use authenticate the user device 110 when communicating with the UEM server 140. The UEM agent 114 can store the certificate in the certificate store 122.

At stage 308, the UEM agent 114 can install the configuration profile. This can include writing new entries into the registry 124 and installing any software installation packages in the configuration profile. In an example, installing the configuration profile can include installing non-management services on the user device 110. An example of one such service can include remote assist capabilities, which can grant access or control to a trusted remote device, such as an admin device. A second such service can include data gathering capabilities that includes instructions for which types of data to gather and report. A third such service can include the VPN tunnel client 118 that the UEM agent 114 can use to securely communicate with the UEM server 140 to exchange enterprise data. In one example, the UEM agent 114 can configure the VPN tunnel client 118 to communicate on a private communication channel only the UEM agent 114 and associated processes and threads operate on.

At stage 310, the UEM agent 114 can retrieve a UDID and HWDevID (identified as "HDID" in FIGS. 3 and 4) of the user device 110. In an example, the UDID can be an ID previously written to the registry 124 by the third-party client 112. In one example, the HWDevID can be one of or a combination of a hard disk ID, a BIOS ID, a MAC address, a serial number, and a model number. The UEM agent 114 can be configured to collect one or a certain combination of these IDs and create a hash of it. At stage 312, the UEM agent 114 can send the UDID and HWDevID to the UEM server 140.

At stage 314, the UEM agent 114 can collect data from the user device 110. The data can include event data and telemetry data, for example. Some examples of such data can include successful and failed logons; boot sequences; shutdowns; screensaver events; application crashes, starts, exits, hangs, installs, and uninstalls; device lock, unlock, logoff, sleep, and wake events; unexpected shutdowns; system crashes; software patch installs and uninstalls; and service starts, stops, and installs. At stage 316, the UEM agent 114 can send some or all the collected data to the UEM server 140.

At stage 318, the third-party client 112 can be removed from the user device 110. For example, a user can uninstall the third-party client 112 or remove its device management rights. To upgrade the UEM agent 114 from limited to full management mode, removing the device management access of the third-party client 112 may be required in examples where the third-party client 112 restricts access to the managed channel 130.

At stage 320, the UEM agent 114 can enroll the user device 110 in full management mode with the UEM server 140. In one example, the enrollment can be initiated by a user making a request from the user device 110. In another example, an admin user, using an admin console, can initiate an enrollment request that causes the UEM server 140 to push the full management mode enrollment to the user device 110.

In an example, the UEM agent 114 can send the certificate received at stage 306 to the UEM server 140 for authenticating the user device 110. In one example, the UEM agent 114 can send the UDID, HWDevID, or both. In another example, the UDID and HWDevID can be encrypted. For example, the UEM agent 114 can create a hash of the UDID, HWDevID, or both. In one example, the UDID and HWDevID can be encrypted within the certificate.

In an example, the third-party client 112 may be configured to wipe the user device 110, or portions thereof, when it or its device management access is removed. This can cause the UDID to be erased from the registry 124. In such an example, the HWDevID would not change. A user can initiate the full enrollment mode request from the user device 110 and the UEM agent 114 can send the HWDevID to the UEM server 140. The UEM server 140 can use the HWDevID to determine that the user device 110 was previously enrolled in limited management mode and to identify data previously collected from the user device 110.

At stage 322, the UEM server 140 can generate a full management mode configuration profile for the user device 110. The full management mode configuration profile can be a data file, such as an XML, JSON, or HTTP file, that includes configuration settings and any software packages related to features of full management mode. In one example, the configuration profile can be customized to the user device 110 based on the data collected at stage 314. At stage 324, the UEM server 140 can send the full management mode configuration profile to the UEM agent 114.

At stage 326, the UEM agent 114 can install the configuration profile for full management mode. Installing the configuration profile can include installing any software installation files and adding registry files to the registry 124. The configuration profile for full management mode can give the UEM agent 114 device management capabilities it did not have in limited management mode. For example, the UEM agent 114 can gain access to the managed channel 130, managed applications 132, and managed services 134. In one example, the UEM agent 114 can install managed applications 132 from the UEM server 140 onto the managed channel 130.

Figure 4:
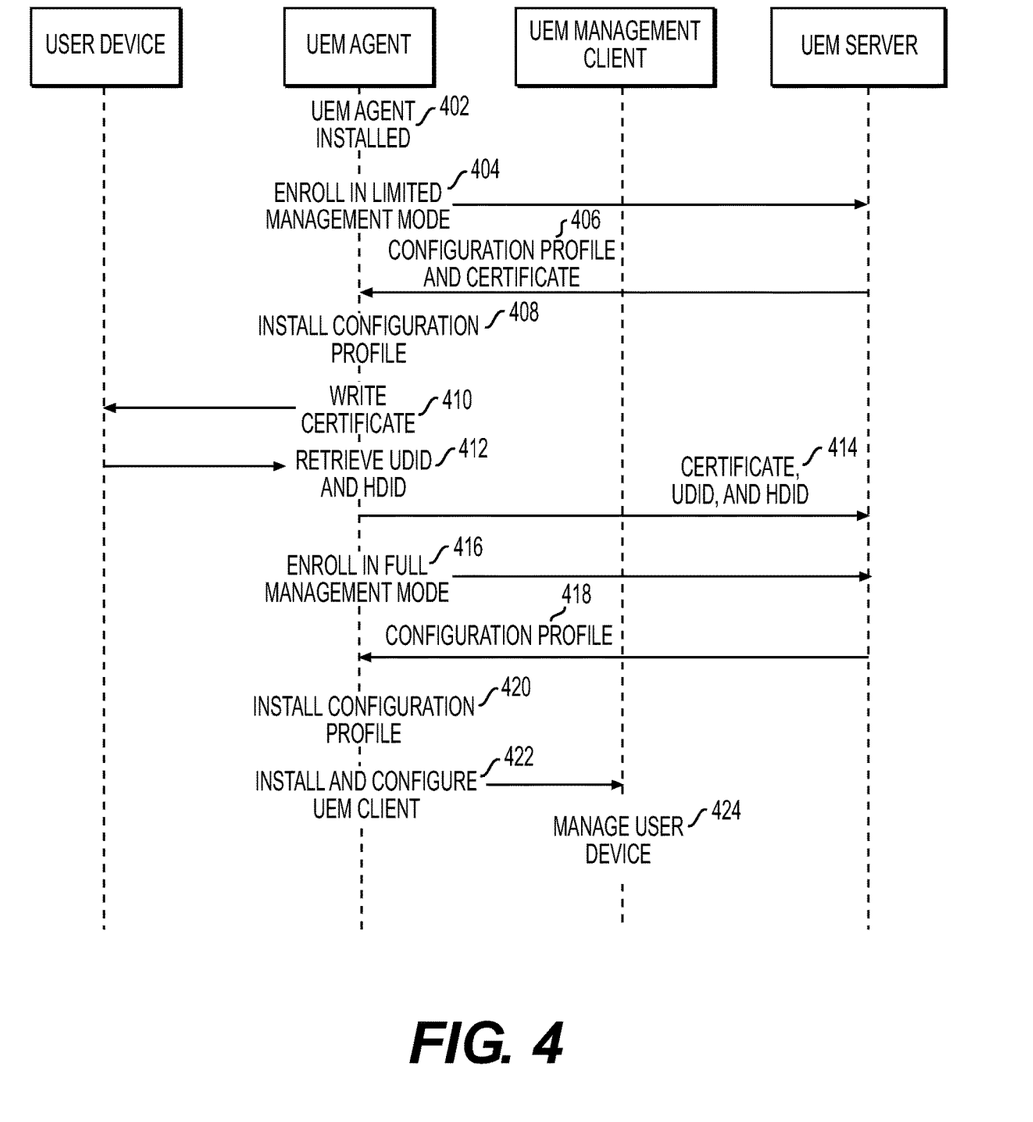
FIG. 4 is another sequence diagram of an example method for performing limited device management.

FIG. 4 is another sequence diagram of an example method for performing limited device management where the UEM agent 114 is responsible for non-management functions and the UEM management client 116 is responsible for management functions. At stage 402, the UEM agent 114 can be installed on the user device 110. In one example, a user can manually download the UEM agent 114, such as by clicking on a download link on a website or by downloading the UEM agent 114 from an application catalogue, depending on the example. In one example, the UEM management client 116 can also be installed on the user device 110. For example, the UEM agent 114 and UEM management client 116 can be installed as a single software package. In one example, the UEM management client 116 can be installed later, such as when the UEM agent installs a full management configuration profile as described at stage 420 below.

At stage 404, the UEM agent 114 can enroll the user device 110 with the UEM server 140 in limited management mode. For example, the UEM agent 114 can send an enrollment request to the UEM server 140. In an example, the enrollment request can include credentials for a user profile that the UEM server 140 can use to authenticate the user device 110. In one example, the request can indicate the desired enrollment type. In another example, a user ID in the credentials can be mapped to a table accessible by the UEM server 140 that indicates that the user device 110 should be enrolled in limited management mode.

At stage 406, the UEM server 140 can send a send a configuration profile for limited management mode and a certificate to the UEM agent 114. In an example, the configuration profile can be a data file, such as an XML, JSON, or HTML file. In another example, the certificate can be a security certificate that the UEM agent 114 can use authenticate the user device 110 when communicating with the UEM server 140. The UEM agent 114 can store the certificate in the certificate store 122.

At stage 408, the UEM agent 114 can install the first configuration profile. This can include writing new entries into the registry 124 and installing any software installation packages in the configuration profile. In an example, installing the configuration profile can include installing non-management services on the user device 110. An example of one such service can include remote assist capabilities, which can grant access or control to a trusted remote device, such as an admin device. A second such service can include data gathering capabilities that includes instructions for which types of data to gather and report. A third such service can include the VPN tunnel client 118 that the UEM agent 114 can use to securely communicate with the UEM server 140 to exchange enterprise data. In one example, the UEM agent 114 can configure the VPN tunnel client 118 to communicate on a private communication channel only the UEM agent 114 and associated processes and threads operate on.

At stage 410, the UEM agent 114 can write the certificate to the user device 110. For example, the UEM agent 114 can write the certificate to the certificate store 122 where the certificate can be securely stored on the user device 110. The certificate can be used to authenticate the UEM agent 114 when it communicates with the UEM server 140, such as by requesting enterprise resources.

At stage 412, the UEM agent 114 can retrieve the UDID and HWDevID from the user device 110. In an example, the UDID can be an ID previously written to the registry 124 by the third-party client 112. In one example, the HWDevID can be one of or a combination of a hard disk ID, a BIOS ID, a MAC address, a serial number, and a model number. The UEM agent 114 can be configured to collect one or a certain combination of these IDs and create a hash of it. At stage 412, the UEM agent 114 can retrieve a UDID and HWDevID from the user device 110. At stage 414, the UEM agent 114 can send the certificate, UDID, and HWDevID to the UEM server 140.

At stage 416, the UEM agent 114 can request to enroll the user device 110 with the UEM server 140 in full management mode. In one example, the enrollment can be initiated by a user making a request from the user device 110. In another example, an admin user, using an admin console, can initiate an enrollment request that causes the UEM server 140 to push the full management mode enrollment to the user device 110. In an example, the UEM agent 114 can send the certificate received at stage 406 to the UEM server 140 for authenticating the user device 110. In one example, the UEM agent 114 can send the UDID, HWDevID, or both. In another example, the UDID and HWDevID can be encrypted. For example, the UEM agent 114 can create a hash of the UDID, HWDevID, or both. In one example, the UDID and HWDevID can be encrypted within the certificate.

In an example, the third-party client 112 may be configured to wipe the user device 110, or portions thereof, when it or its device management access is removed. This can cause the UDID to be erased from the registry 124. In such an example, the HWDevID would not change. A user can initiate the full enrollment mode request from the user device 110 and the UEM agent 114 can send the HWDevID to the UEM server 140. The UEM server 140 can use the HWDevID to determine that the user device 110 was previously enrolled in limited management mode and to identify data previously collected from the user device 110.

At stage 418, the UEM server 140 can send a configuration profile for full management mode (the "second configuration profile") to the UEM agent 114. The full management mode configuration profile can be a data file, such as an XML, JSON, or HTTP file, that includes configuration settings and any software packages related to features of full management mode. In one example where the UEM management client 116 is not yet installed on the user device 110, the full management mode configuration profile can include a software installation file for doing so. In one example, the software installation file can be instructions that cause the UEM agent 114 to request the software installation file from a server using a particular Uniform Resource Locator ("URL").

At stage 420, the UEM agent 114 can install the second configuration profile. In one example, installing the configuration profile can include adding registry files to the registry 124. The configuration profile for full management mode can give the UEM agent 114 device management capabilities it did not have in limited management mode. For example, the UEM agent 114 can gain access to the managed channel 130, managed applications 132, and managed services 134. In one example, the UEM agent 114 can install managed applications 132 from the UEM server 140 onto the managed channel 130.

At stage 422, the UEM agent 114 can install and configure the UEM management client 116 on the user device 110. As discussed earlier, in some examples the user device 110 can have the UEM management client 116 installed before this stage. In such an example, the UEM agent 114 can configure the UEM management client 116 to operate in full management mode. In one example, the UEM management client 116 can already include some or all the configuration settings. In this example, the UEM agent 114 can merely activate the UEM management client 116, such as by starting an initialization service for the UEM management client 116 on the OS of the user device 110.

At stage 424, the UEM management client 116 can manage the user device 110. For example, configuring the UEM management client 116 can give it access to the managed channel 130. The UEM management client 116 can communicate with applications 132 and services 134 on the managed channel 130. In one example, the UEM management client 116 can receive and execute instructions from the UEM server 140 for installing certain managed applications 132 and server 134 on the managed channel 130. The UEM management client 116 can also execute other management related operations, like device update management and device health attestation.

In an example, the UEM agent 114 can continue to execute non-management operations like collecting data, providing remote access, maintaining related registry files in the registry 124, and managing the VPN tunnel client 118. In one example, the UEM management client 116 can also communicate with the UEM server 140 through the VPN tunnel client 118.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for managing a user device, comprising:
  sending, to a server, a request to enroll a user device in a limited management mode, the user device having a third-party management client that communicates management instructions to the user device from a third-party server using a management channel on the user device;
  receiving, from the server, a first configuration profile;
  configuring an agent on the user device in the limited management mode using the first configuration profile, the agent being configured to use a channel on the user device other than the management channel for executing instructions received from the server;
  sending, to the server, a request to enroll the user device in a full management mode;
  receiving, from the server, a second configuration profile;
  configuring the agent in the full management mode using the second configuration profile, including causing the agent to use the management channel, wherein the third-party management client stops using the management channel; and
  prior to configuring the agent in the full management mode, determining that the third-party management client no longer manages the user device.

2. The method of claim 1, further comprising sending, to the server, a hardware device identifier ("HWDevID") associated with the user device, wherein the second configuration profile is based at least on the HWDevID.

3. The method of claim 2, wherein the HWDevID is a hash of at least one of a hard disk identifier ("ID"), a Basic Input/Output System ("BIOS") ID, a media access controller ("MAC") address, a serial number, and a model number.

4. The method of claim 1, wherein:
  while in limited management mode, the agent collects data about the user device and sends it to the server, and the second configuration profile is based at least on the collected data.

5. The method of claim 1, wherein the first configuration profile includes an install package for a Virtual Private Network ("VPN") tunnel client.

6. The method of claim 1, wherein, while in limited management mode, the agent does not have access to the management channel on the user device.

7. A non-transitory, computer-readable medium containing instructions that, when executed by a hardware-based processor, performs stages for managing a user device, the stages comprising:
  sending, to a server, a request to enroll a user device in a limited management mode, the user device having a third-party management client that communicates management instructions to the user device from a third-party server using a management channel on the user device;
  receiving, from the server, a first configuration profile;
  configuring an agent on the user device in the limited management mode using the first configuration profile, the agent being configured to use a channel on the user device other than the management channel for executing instructions received from the server;
  sending, to the server, a request to enroll the user device in a full management mode;
  receiving, from the server, a second configuration profile;
  configuring the agent in the full management mode using the second configuration profile, including causing the agent to use the management channel, wherein the third-party management client stops using the management channel; and
  prior to configuring the agent in the full management mode, determining that the third-party management client no longer manages the user device.

8. The non-transitory, computer-readable medium of claim 7, further comprising sending, to the server, a hardware device identifier ("HWDevID") associated with the user device, wherein the second configuration profile is based at least on the HWDevID.

9. The non-transitory, computer-readable medium of claim 8, wherein the HWDevID is a hash of at least one of a hard disk identifier ("ID"), a Basic Input/Output System ("BIOS") ID, a media access controller ("MAC") address, a serial number, and a model number.

10. The non-transitory, computer-readable medium of claim 7, wherein:
  while in limited management mode, the agent collects data about the user device and sends it to the server, and the second configuration profile is based at least on the collected data.

11. The non-transitory, computer-readable medium of claim 7, wherein the first configuration profile includes an install package for a Virtual Private Network ("VPN") tunnel client.

12. The non-transitory, computer-readable medium of claim 7, wherein, while in limited management mode, the agent does not have access to the management channel on the user device.

13. A system for managing a user device, comprising:
  a memory storage including a non-transitory, computer-readable medium comprising instructions; and
  a computing device including a hardware-based processor that executes the instructions to carry out stages comprising:
    sending, to a server, a request to enroll a user device in a limited management mode, the user device having a third-party management client that communicates management instructions to the user device from a third-party server using a management channel on the user device;
    receiving, from the server, a first configuration profile;
    configuring an agent on the user device in the limited management mode using the first configuration profile, the agent being configured to use a channel on the user device other than the management channel for executing instructions received from the server;
    sending, to the server, a request to enroll the user device in a full management mode;
    receiving, from the server, a second configuration profile;

configuring the agent in the full management mode using the second configuration profile, including causing the agent to use the management channel, wherein the third-party management client stops using the management channel; and prior to configuring the agent in the full management mode, determining that the third-party management client no longer manages the user device.

14. The system of claim 13, further comprising sending, to the server, a hardware device identifier ("HWDevID") associated with the user device, wherein the second configuration profile is based at least on the HWDevID.

15. The system of claim 14, wherein the HWDevID is a hash of at least one of a hard disk identifier ("ID"), a Basic Input/Output System ("BIOS") ID, a media access controller ("MAC") address, a serial number, and a model number.

16. The system of claim 13, wherein:

while in limited management mode, the agent collects data about the user device and sends it to the server, and the second configuration profile is based at least on the collected data.

17. The system of claim 13, wherein the first configuration profile includes an install package for a Virtual Private Network ("VPN") tunnel client.

* * * * *